Sept. 4, 1934.                S. B. WOODYARD                1,972,122
                  COMBINATION SQUARE, LEVEL, AND PROTRACTOR
                           Filed Sept. 16, 1930
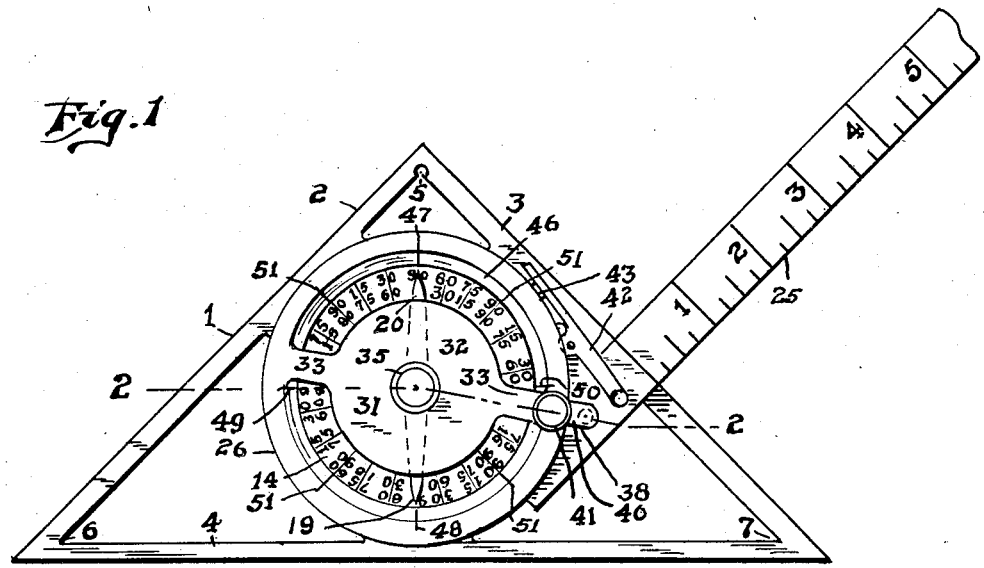
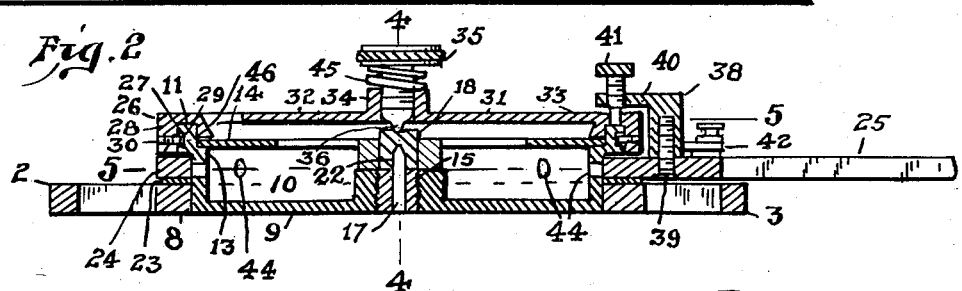
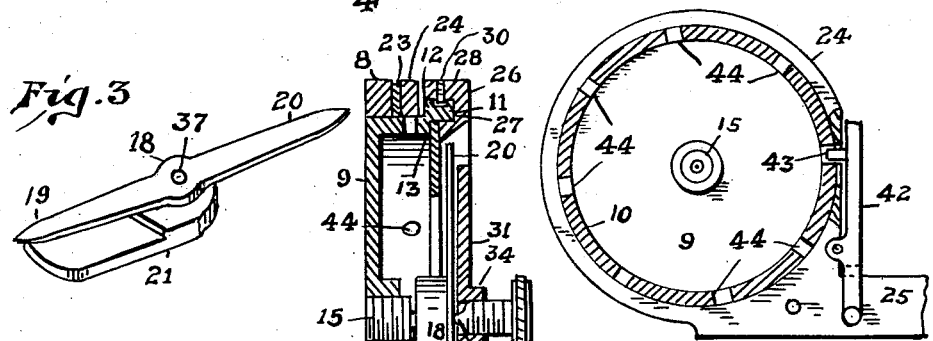
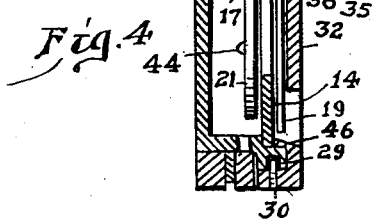
INVENTOR
S. B. Woodyard
by F. N. Barber
attorney Patented Sept. 4, 1934

1,972,122

UNITED STATES PATENT OFFICE 1,972,122

COMBINATION SQUARE, LEVEL, AND PROTRACTOR

Saunders B. Woodyard, McKeesport, Pa., assignor of one-half to L. W. Crawford, McKeesport, Pa.

Application September 16, 1930, Serial No. 482,256

7 Claims. (Cl. 33—93)

My invention relates to a combination tool embodying a square, a level, a protractor, a T-square and the like.

One object of this invention is to provide a dial along which a pendulum type of indicator or pointer may move to show the angular distance between the pointer of the pendulum and some index mark on the base which carries the pendulum, in combination with means for fixing the pointer with respect to any indication with which it corresponds on the dial.

Another object is to provide a ruler attached to a rotatable ring concentric with the axis of the pointer, there being suitable indications on the ring to show the degrees the ruler makes with any selected edge of the base or frame of the device, or to indicate the number of degrees the ring and the ruler have been moved or are to be moved to place the ruler in a selected angular position with respect to a scale, the pointer, or any one of the sides of the base or frame.

Another object is to locate the center of the ring and the position thereon of the ruler so that the latter can be placed parallel with any one of the three sides of a right angled triangular frame to form two squares with respect to the sides about the right angle and to form a straight-edge with the hypotenuse member of the triangle. Other objects will appear hereinafter.

Referring to the accompanying drawing, Fig. 1 is a side view of my invention with the ruler broken off; Fig. 2, an enlarged view on the line 2—2 on Fig. 1; Fig. 3, a perspective view of the pendulum indicator; Fig. 4, a section on the line 4—4 on Fig. 2, and Fig. 5, a section on the line 5—5 on Fig. 2.

On the drawing, 1 designates a triangular frame having the three bar-like sides 2, 3, and 4, the sides 2 and 3 making a right angle with each other and the side 4 being the hypotenuse member. 5 indicates the right angle and 6 and 7 indicate the two acute angles of the triangle.

A metal ring 8 is secured to the inner edges of the members 2, 3, and 4 of the frame so that a line drawn from the apex of the angle 5 through the center of the ring will meet the side 4 at right angles. Thus, the center of the ring is located at the intersection of the bisectors of the angles 5, 6, and 7. The metallic circular cup-like member 9 is seated within the ring 8 and made rigid therewith, the bottom of the cup being flush with the bottom of the frame as shown in Fig. 2. The circular flange 10 of the cup member extends beyond the frame and has its upper edge off-set outwardly to form the bead 11 having the annular shoulder 12 beyond the outer face of the flange 10 and overhanging an annular space between itself and the ring 8. Within the bead 11 and upon the outer end of the flange 10 is the shoulder 13 on which the circular dial plate 14 provided with suitable graduations is placed.

The center post 15 is screwed into the center of the bottom of the cup member 9 and stands centrally within the flange 10. Centrally within the post 15 is the pivot 17 extending somewhat above the post 15. 18 is a pendulum indicator having the two opposite pointer arms 19 and 20. This indicator has opposite the weight 21 the pointer 19 which is spaced therefrom. This indicator has the axial opening 22 to receive the upper end of the pivot pin 17 as shown in Fig. 2. The weight is between the dial 14 and the bottom of the cup member 9 while the pointers are on the opposite side of the dial from the weight.

23 is a spacing ring lying against the ring 8 and also against the ring 24 which surrounds the flange 10 of the cup member 9. The rings 23 and 24 lie between the ring 8 and the shoulder 12, both surrounding the flange 10. The ring 24 carries the ruler 25 which lies parallel with the frame 1. The edge of the ruler farthest from the center of the dial lies so that it may register with the outer face of any one of the three sides 2, 3, and 4 of the frame 1. When the outer edge of the ruler 25 registers with the side 2, a square is formed having one side thereof formed by the side 3 and the other side thereof formed of the side 2 and the outer edge of the ruler. When the outer edge of the ruler registers with the side 3, a square will be formed with the side 2 of the triangle and the inner edge of the ruler. Also at the same time a straight-edge will be formed by the side 3 and the outer edge of the ruler. When the ruler registers with the side 4 of the frame, this side together with the outer edge of the ruler form a straight-edge while the side 3 and the inner edge of the ruler form an angle of 135°. When the ring 24 is turned to make the ruler at right angles to any side of the triangle, a T-square is formed with that side.

26 is a ring having on its inner face the groove 27 which fits over the outer edge of the bead 11 thus providing a flange 28 surrounding the periphery of the bead. The periphery of the bead has an annular recess 29 to receive the inner end of pins 30 screwed through the flange 28 and extending into the recess 29. These pins secure the ring 26 rotarily to the bead and therefore to the cup member 9 so that the ring 26 may be rotated independently of the bead. The inner wall of the ring 26 overlies the outer portion of the dial 14 which is held between the shoulder 13 and this ring. The ring 26 has flush with its outer face the cross-member 31, which comprises a circular central portion 32 and the two arms 33 which connect the portion 32 to the ring 26. Thus there is left between the periphery of the center portion 32 and the inner wall of the ring 26 an annular space to expose graduations on the dial and the ends of the pointer which latter lies between the cross-member 31 and the dial.

The outer face of the center portion 32 has the screw threaded boss 34 to receive the thumb screw 35 having the pivot point 36 extending into a recess 37 in the central portion of the outer face of the pendulum indicator 18, the recess being directly opposite the pivot 17. A coil spring 45 surrounds the thumb screw between its head and the boss 34 to prevent the screw from turning accidentally.

The ruler 25 carries the angular member 38 having one arm secured to the ruler 25 by the screw 39, the other member 40 overhanging the ring 26. This arm 40 carries the set screw 41 which passes through the ring 26 and has a reduced extension on its inner end to engage the bead 11 in order to prevent rotation of the ring 26 with respect to the frame, the cup member 9 and the rings 24 and 26. The set screw may be used to hold the ruler 25 in any selected angular position relative to the sides of the frame so that the angles may be traced without any danger of the movement of the square with respect to the frame.

The inner end of the ruler 25 carries the pivoted lever 42 carrying the pin 43 which extends through a radial opening in the ring and may be seated in any one of a number of holes 44 in the flange 10.

The inner beveled edge 46 of the ring 26 has a number of indicating marks which may be registered with the ends 19 and 20 of the pointer or with selected indications of the dial. Two marks 47 and 48 are placed on the beveled edge at diametrically opposite points so that these marks will lie in an imaginary line drawn from the center of the angle 5 through the center of the dial and ring 26 to the center of the side 4. The beveled edge also contains the two diametrically opposite marks 49 and 50 arranged in an imaginary line at right angles to the first imaginary line. Other marks 51 are placed on the beveled edge half way between the marks 47—50, 50—48, 48—49, and 49—47.

If the side 4 of the frame be placed upon a horizontal surface the pointers will stand opposite the marks 47 and 48. If the surface on which the side 4 rests is not horizontal the pointer will stand at one side of the marks 47 and 48 and the number of degrees of variation of the pointer from these marks can be read to ascertain the variation of the side 4 from true horizontal. In case the tested horizontal surface is in a dark place or a high place so that the reading cannot be readily made, the thumb screw 35 may be turned down so as to clamp the member 18 to the post 15. Then the instrument may be easily read without any danger of the pointer moving from the place where it stood when the test was made.

In case a vertical surface is to be tested the side 4 may be placed against this surface and the pointers will vary from the marks 49 and 50 to indicate the angular position of the said surface from the true vertical. When the side 4 is placed against a surface the pointers 19 and 20 will indicate by their angular distance from the marks 47 and 48 the angle which the side 4 makes with the true horizontal. The angular distance of the pointers from the marks 49—50 indicates a variation of the side 4 from true vertical. The sides 2 and 3 may be used to obtain an angular variation of surfaces from the true vertical and horizontal. When the side 2 is placed on a surface to ascertain whether or not it is horizontal, and the side 3 is placed against a surface to determine whether or not it is truly vertical, the pointers stand opposite the marks 51 which are parallel with the side 3 if the surface is strictly horizontal or vertical. The variation of the pointer from the said marks 51 will indicate the variation of the surfaces from the true horizontal or vertical. In case the side 3 is used to test a horizontal surface or the side 2 a vertical surface the pointers will stand opposite the marks 51 which are parallel with the side 2 in case the surface tested by the side 3 is truly horizontal or the side tested by the side 2 is truly vertical. In all these cases the reading may be taken without clamping the pointer if desired.

When the invention has been used for any of the purposes stated in the last two paragraphs, the ruler may be used to draw any desired angle from any side of the frame. If the side 3 has been arranged to show an angle of 30° from the vertical and it is desired to draw a line at an angle from the side 3, the ruler can be correspondingly set and the line with the desired angle to the side 3 or to the vertical may be drawn along one side of the ruler, so that the pendulum indicator has cooperative relation with the ruler.

The holes 44 are arranged so as to hold the ruler at right angles to any side of the frame or at any position at an angle of 45° from any side thereof. The ruler may be moved angularly about the center of the ring 24 any number of degrees without the necessity of reversing its movement as there is no obstruction to the complete rotation of the ring 24.

I claim:—

1. In a device of the class described, a polygonal frame, a ruler, means rotatably mounting the ruler on the frame, the center of rotation of the ruler and its distance from that center and the distance of the sides of the frame from that center being such that one edge of the ruler may be made to selectively coincide with each side of the frame.

2. In a device of the class described, a polygonal frame, a ruler, and means rotatably mounting the ruler on the frame, the center of rotation of the ruler and its distance from that center and the distance of the sides of the frame from that center being such that one edge of the ruler may be made to selectively coincide with each side of the frame and project at selected angles from each side.

3. In a device of the class described, a polygonal frame having a straight-edged side, a circular element secured to the frame, a ring concentric with the circular element and rotatable on its axial center and on the periphery of the circular element, a dial parallel with the ring and held in fixed relation with the frame and the circular element, a ruler carried by the ring and lying in a plane at right angles to the axis of the ring, and a pendulum pointer coaxial with the dial and having free automatic travel opposite the same, whereby the ruler may be placed at a selected angle with the vertical as indicated by the pendulum pointer.

4. In a device of the class described, a polygonal frame having a straight-edged side, a circular element secured to the frame, a ring concentric with the circular element and rotatable on its axial center and on the periphery of the circular element, a dial parallel with the ring and held in fixed relation with the frame and the circular element, a ruler carried by the ring and lying in a plane at right angles to the axis of the ring, and a pendulum pointer coaxial with the dial and having free automatic travel opposite the same, whereby the ruler may be placed at a selected angle with the vertical as indicated by the pendulum pointer, in combination with means for releasably fixing the ruler in any selected angular relation with the said side.

5. In a device of the class described, a polygonal frame, a ruler rotatable in a plane parallel to the frame, the center of rotation of the ruler and its distance from that center and the distance of the sides of the frame from that center being such that one edge of the ruler may be made to selectively coincide with each side of the frame, in combination with means for causing the ruler to be fixed releasably in pre-determined angular relations with the sides of the frame, whereby the ruler may be placed at a selected angle with the vertical as indicated by the pendulum pointer.

6. In a device of the class described, a right angled triangular frame composed of bars, a ring parallel with the frame and carried by the inner edges of the bars, a cup-like member carried by the inner edge of the ring, a pivot carried by the center of the bottom of the said member and projecting into the cup-like member, a pendulum pointer carried by the pivot and arranged to swing freely parallel with the frame, a dial fixed to the said cup-like member and opposite the ends of the pointer and co-axial therewith, a rotatable ring carried by the said cup-like member and co-axial with the same, a ruler carried by the rotatable ring and parallel therewith, means for releasably connecting the ring and the frame into a rigid unit, and a ring fixed to the said cup-like member and covering the outer portion of the face of the dial, indicator marks being on the last ring and on the dial, the marks on the dial indicating the angular position of the pointer relative to the marks on said ring, whereby the ruler may be placed at a selected angle with the vertical as indicated by the pendulum pointer.

7. In a device of the class described, a right angled triangular frame composed of bars, a ring parallel with the frame and carried by the inner edges of the bars, a cup-like member carried by the inner edge of the ring, a pivot carried by the center of the bottom of the said member and projecting into the cup-like member, a pendulum pointer carried by the pivot and arranged to swing freely parallel with the frame, a dial fixed to the said cup-like member and opposite the ends of the pointer and co-axial therewith, a rotatable ring carried by the said cup-like member and co-axial with the same, a ruler carried by the rotatable ring and parallel therewith, and a ring fixed to the said cup-like member and covering the outer portion of the face of the dial, indicator marks being on the last ring and on the dial, the marks on the dial indicating the angular position of the pointer relative to the marks on said ring, in combination with means carried by the rotatable ring and extending through the same for engagement with the cup-like member for securing the frame and the ruler in fixed relationship with each other, whereby the ruler may be placed at a selected angle with the vertical as indicated by the pendulum pointer.

SAUNDERS B. WOODYARD.